(12) United States Patent
Hoyte et al.

(10) Patent No.: US 6,347,692 B1
(45) Date of Patent: Feb. 19, 2002

(54) SHOCK ABSORBER CARTRIDGE

(75) Inventors: David S. Hoyte, McCordsville, IN (US); Stephen H. Bell, Guelph (CA)

(73) Assignee: Gabriel Ride Control Products, Inc., Brentwood, TN (US)

( * ) Notice: Subject to any disclaimer, the term of this patent is extended or adjusted under 35 U.S.C. 154(b) by 0 days.

(21) Appl. No.: 09/612,031

(22) Filed: Jul. 7, 2000

Related U.S. Application Data

(60) Provisional application No. 60/213,566, filed on Jun. 22, 2000.

(51) Int. Cl.$^7$ .................................................. F16F 9/00
(52) U.S. Cl. ................................................. 188/322.19
(58) Field of Search ....................... 188/322.16–322.19, 188/322.12, 322.22, 312, 218; 267/34, 175, 177, 221; 277/503, 505, 582, 910, 916

(56) References Cited

U.S. PATENT DOCUMENTS 5,941,351 A * 8/1999 Etnyre .................... 188/322.17
6,155,545 A * 12/2000 Noro .......................... 267/221

* cited by examiner

Primary Examiner—Christopher P. Schwartz
Assistant Examiner—C. T. Bartz
(74) Attorney, Agent, or Firm—McAndrews, Held & Malloy, Ltd.

(57) ABSTRACT

A shock absorber cartridge for use in a shock absorber assembly. The shock absorber cartridge includes a cartridge containment member having an inner cavity, an opening, and a lip about the opening. The shock absorber cartridge also includes an inner shock assembly disposed substantially in the inner cavity of the cartridge containment member. The inner shock assembly includes an inner shock cylinder. The lip of the cartridge containment member engages-the outer surface of the inner shock assembly, preferably at the outer surface of the inner shock cylinder.

12 Claims, 2 Drawing Sheets

SHOCK ABSORBER CARTRIDGE

CROSS REFERENCE TO RELATED APPLICATIONS

The present application is based on, and claims priority from, provisional application No. 60/213,566, filed Jun. 22, 2000, titled "Shock Absorber Cartridge", which is incorporated herein in its entirety by reference.

STATEMENT REGARDING FEDERALLY SPONSORED RESEARCH OR DEVELOPMENT (NOT APPLICABLE)

BACKGROUND OF THE INVENTION

The present invention relates generally to vehicular shock absorber assemblies or suspension systems. More specifically, the present invention relates to shock absorber cartridges for use in shock absorber assemblies.

Shock absorber assemblies are commonly used to increase rider comfort in vehicles. Shock absorber assemblies include many components and subassemblies. Conventionally, shock absorber components are produced in geographically diverse locations and then shipped to a final assembly location where they are assembled into the end product. The components and subassemblies are generally produced in locations where their production is economically optimal. The same component or subassembly may be produced by sources at multiple geographic locations. The components and subassemblies are typically shipped to a final destination for final assembly near the geographical location of a market.

Producing components and subassemblies at geographically diverse locations introduces many problems. The logistics of controlling the production of many geographically diverse production facilities, each potentially acquiring components and subassemblies from their own respective preferred sources, can be complex. In addition, producing a particular subassembly at diverse locations is generally inefficient relative to producing all of the particular subassembly at one location. For example, large-scale production allows a production facility to take advantage of economies of scale when purchasing, producing and assembling components. Large-scale production at a single location also lends itself more readily to automation than small-scale production at diverse locations.

Controlling the quality of a product produced at diverse locations is difficult. Multiple manufacturers may produce the components, the quality of the workforce and raw materials may vary geographically, and the production facilities and equipment may vary greatly. Assembling most of the total number of a subassembly at one location enhances a producer's ability to control the quality of the subassembly. The producer may sample or test incoming components to ensure that a source is supplying components within allowable tolerances. The producer may establish a quality improvement relationship with key suppliers. The producer may measure or test the subassemblies to ensure that the subassemblies meet design specifications. The measurements and test results may be used for production process control.

A disadvantage of typical shock absorbers and shock absorber components is that they often involve mechanical assembly in conjunction with introducing specific amounts of fluid and/or compressible media. The final shock assembly and particular subassemblies must be partially or completely sealed following the introduction of the fluid and compressible media. Hence, particular subassemblies are not well suited for production at a remote central facility or for subsequent shipment to another production facility.

Since the fluid and compressible media is typically not incorporated into a shock absorber until final assembly, it is difficult to evaluate the performance of particular subassemblies until after final assembly. For example, testing the damping of an inner shock cylinder subassembly (or shock absorber cartridge) including an inner shock cylinder, piston, piston rod, and valve assemblies practically requires introducing fluid and compressible media into the subassembly prior to testing. Even if such a subassembly could be tested in a practical manner prior to shipment to a final assembly facility, the subassembly could become contaminated or lose fluid during shipping. Additionally, the subassembly could be loaded with an improper type or amount of fluid during final assembly at the final production facility. Changes to the subassembly characteristics during shipment or assembly into the final product could render previous subassembly quality control measures ineffective.

A need has long existed for an improved shock absorber cartridge that is manufacturable and testable. A need has also long existed for an improved shock absorber cartridge that maintains its operational characteristics during shipment and subsequent assembly operations.

SUMMARY OF THE INVENTION

Accordingly, it is an object of the present invention to provide a shock absorber cartridge that is manufacturable, testable and shippable.

It is also an object of the present invention to provide a shock absorber cartridge that is readily testable at the manufacturing site.

It is a further object of the present invention to provide a shock absorber cartridge that will substantially maintain its operational characteristics during shipping and installation into a final assembly.

One or more of the foregoing objects is met in whole or in part by a preferred embodiment of the present invention that provide an improved shock absorber cartridge. The shock absorber cartridge includes a cartridge containment member (CCM) having an inner cavity, an opening, and a lip about the opening. The shock absorber cartridge also includes an inner shock assembly disposed substantially in the inner cavity of the CCM. The inner shock assembly includes an inner shock cylinder. A base valve assembly is coupled to one end of the inner shock cylinder, and an upper cylinder head is coupled to the other end. A piston is disposed in the inner cavity of the inner shock cylinder, and a piston rod is coupled to the piston. The piston rod extends from the piston, through the upper cylinder head, and out of the inner shock cylinder. The lip of the CCM engages the outer perimeter of the inner shock cylinder. The inner shock assembly and CCM are filled with a specified amount of shock fluid, and the coupling between the CCM and the inner shock cylinder is sealed to contain the shock fluid.

In the following detailed description, spatially orienting terms are used, such as "upper," "lower," "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

DETAILED DESCRIPTION OF THE PREFERRED EMBODIMENTS OF THE INVENTION

Figure 1:
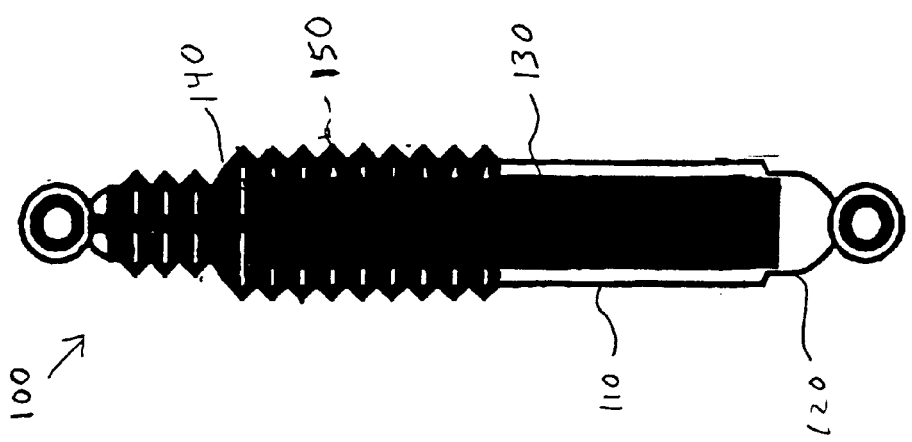
FIG. 1 illustrates a shock absorber assembly including a shock absorber cartridge of the present invention.

A shock absorber or shock absorber assembly 100 including a shock absorber cartridge 130 is shown in FIG. 1. The shock absorber 100 includes an outer cylinder 110 and a lower end cap 120. A shock absorber cartridge 130 is substantially disposed in the inner cavity of the outer cylinder 110. The shock absorber cartridge 130 is coupled to the outer cylinder 110 by a coupling means 140 such as, for example, a spin closure or upper end cap. A protective cover 150 protects the shock absorber 100 from contamination by external agents.

Figure 2:
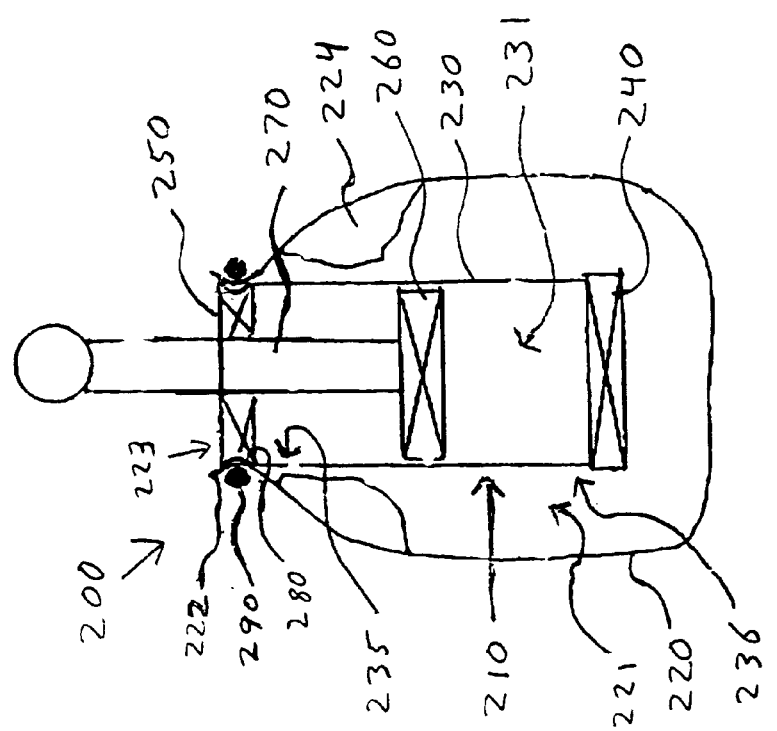
FIG. 2 illustrates a shock absorber cartridge according to an embodiment of the present invention.

A shock absorber cartridge 200 according to an embodiment of the present invention is illustrated in FIG. 2. The shock absorber cartridge 200 includes an inner shock assembly 210 and a cartridge containment member (CCM) 220. The inner shock assembly 210 includes an inner shock cylinder 230, a base valve assembly 240, an upper cylinder head 250, a piston 260, and a piston rod 270. The inner shock cylinder 230 has an upper cylinder end 235, a lower cylinder end 236, an inner cylinder cavity 231, and an outer cylinder perimeter around the outer surface of the inner shock cylinder 230.

The base valve assembly 240 is coupled to the lower cylinder end 236 of the inner shock cylinder 230 and governs the flow of shock fluid in and out of the inner cylinder cavity 231. The upper cylinder head 250 is coupled to the upper cylinder end 235 of the inner shock cylinder 230 and engages the piston rod 270. The piston 260 of the inner shock assembly 200 is disposed in the inner cylinder cavity 231. The piston rod 270 is axially coupled to the piston 260 and protrudes upward through the upper cylinder head 250 and outside of the inner cylinder cavity 231. The upper cylinder head 250 allows translational motion of the piston rod 270 while retaining shock fluid in the inner shock cylinder 230.

The CCM 220 has an inner CCM cavity 221, a CCM opening 223, and a CCM lip 222 around the CCM opening 223. The CCM 220 may also include a gas chamber 224. The CCM 220 preferably comprises a bag, bladder, or other type of flexible liquid and/or gas containment member. The inner shock assembly 210 is substantially disposed in the inner CCM cavity 221 and protrudes through the CCM opening 223. The CCM lip 222 engages the inner shock assembly 210. The CCM lip 222 preferably engages the outer cylinder perimeter of the inner shock cylinder 230 near the upper cylinder end 235. A seal member 290 couples the CCM lip 222 to the inner shock assembly 210. The seal member 290 may comprise, for example, an o-ring.

In one preferred embodiment, the inner shock cylinder 230 includes an annular groove 280 around the upper cylinder end 235 of the inner shock cylinder 230. The annular groove 280 serves as a seal-positioning feature. The seal member 290 is seated in the annular groove 280 and couples the CCM lip 222 to the inner shock cylinder 230 at the annular groove 280. The annular groove 280 enables consistent and stable positioning of the seal member 290. Alternatively, other seal positioning features, such as dimples, may be used to position the seal member 290. The seal member 290 may also be incorporated directly into the CCM lip 222.

The inner cylinder cavity 231 and/or the inner CCM cavity 221 may be filled with a desired amount of shock fluid. The shock fluid may flow between the inner cylinder cavity 231 and inner CCM cavity 221 through the base valve assembly 240 without exiting the shock absorber cartridge 200. The seal between the CCM 220 and the inner shock assembly 210 retains the shock fluid within the shock absorber cartridge 200 and keeps contaminants out of the shock absorber cartridge 200. Since, the shock absorber cartridge 200 may be filled with the specific amount and type of shock fluid desired for use in the complete assembled shock absorber, the shock fluid aspect of shock absorber production may be tightly controlled at the production facility producing the shock absorber cartridge 200.

When the shock absorber cartridge 200 is filled with the desired amount and type of shock fluid, the shock absorber cartridge 200 may be tested to see if it meets design specifications. If the shock absorber cartridge 200 is found to meet specifications, it may then be installed in a final shock assembly or shipped to another production facility for final assembly into a complete shock absorber. By maintaining the cleanliness of the shock absorber cartridge 200 and/or maintaining the quality and amount of fluid introduced into the shock absorber cartridge 200, the CCM 220 serves to maintain the performance characteristics of the shock absorber cartridge 200 during shipping and during final assembly of the shock absorber cartridge 200 into the final shock assembly.

Figure 3:
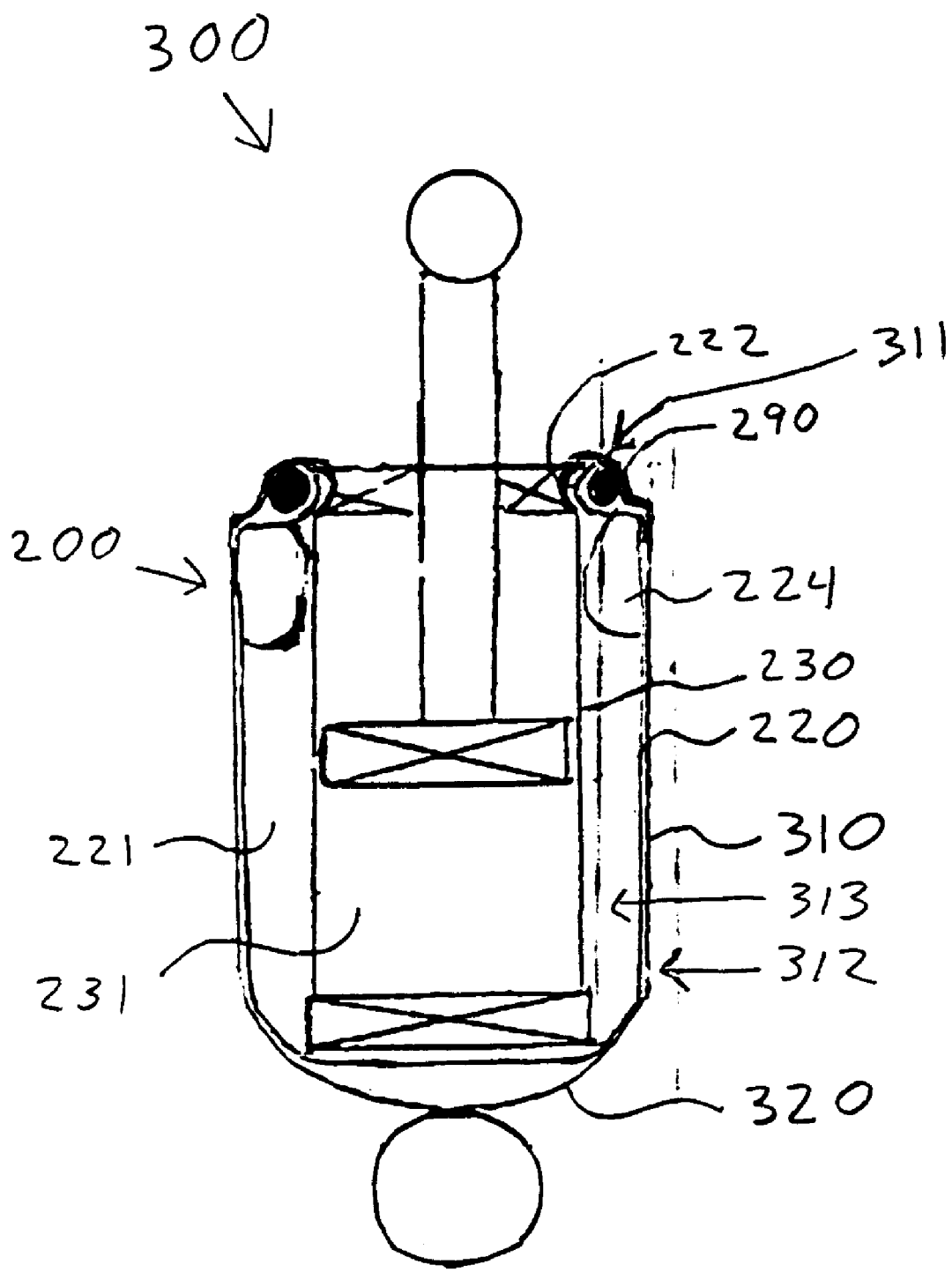
FIG. 3 illustrates a shock absorber including the shock absorber cartridge illustrated in FIG. 2.

FIG. 3 illustrates a shock absorber 300 including the shock absorber cartridge 200 illustrated in FIG. 2. A top outer cylinder end 311, a bottom outer cylinder end 312, and an outer cylinder cavity 313 characterize the outer cylinder 310. A lower end cap 320 is disposed at the bottom outer cylinder end 312 to close the bottom of the outer cylinder 310.

The shock absorber cartridge 200 is substantially disposed in the outer cylinder cavity 313 and protrudes through the top outer cylinder end 311. The top outer cylinder end 311 may be spin closed about the seal member 290 of the shock absorber cartridge 200. The seal member 290 thus becomes a head gasket for the shock absorber 300. This seals the shock absorber 300 at the annular groove 280/CCM lip 222/seal member 290 /top outer cylinder end 311 coupling. Alternatively, the top outer cylinder end 311 may be sealed with an end cap or other sealing means. The inner CCM cavity 221 serves as a reservoir chamber for the shock absorber 300, and the gas chamber 224 contains the compressible medium for the shock absorber 300.

In an alternate preferred embodiment, the CCM 220 may be removed from the shock absorber cartridge 200 prior to final insertion of the shock absorber cartridge 200 into the outer cylinder 310. Even if removed prior to final shock assembly, the CCM 220 has still served to protect the shock absorber cartridge 200 from external contamination during shipping and handling and/or to preserve the amount and quality of shock fluid contained in the shock absorber cartridge 200.

The present invention provides an improved shock absorber cartridge for use in a shock absorber assembly. The shock absorber cartridge enables the economical and quality-controlled construction of the shock absorber cartridge at a central facility. In addition, the shock absorber cartridge provides reduced contamination during shipping and handling of the shock absorber cartridge components. The shock absorber cartridge also enables efficient final assembly of a shock absorber with consistent performance characteristics.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features, which come within the spirit and scope of the invention.

What is claimed is:

1. In a shock absorber assembly including an inner shock sub-assembly having an inner shock cylinder that has an upper cylinder end, a lower cylinder end, an inner cylinder cavity and an outer cylinder perimeter; a base valve assembly coupled to the lower cylinder end; an upper cylinder head coupled to the upper cylinder end; a piston disposed in the inner cylinder cavity; and a piston rod coupled to said piston and extending through the upper cylinder head, the improvement comprising a shock absorber cartridge including: a cartridge containment member (CCM) having an inner CCM cavity, a CCM opening, and a CCM lip; with the inner shock assembly being disposed substantially in the inner CCM cavity and protruding through the CCM opening and with the CCM lip engaging the outer cylinder perimeter near the upper cylinder end.

2. The shock absorber of claim 1, further comprising shock fluid disposed in at least one of the inner CCM cavity and the inner cylinder cavity.

3. The shock absorber of claim 1, further comprising shock fluid disposed in the inner CCM cavity and the inner cylinder cavity.

4. The shock absorber of claim 2, further comprising a seal member which couples said CCM to said inner shock cylinder.

5. The shock absorber of claim 4, wherein said seal member comprises an o-ring disposed about said CCM and the outer cylinder perimeter where the CCM lip engages the outer cylinder perimeter.

6. The shock absorber of claim 1, wherein said CCM further comprises a gas chamber containing a compressible medium.

7. The shock absorber of claim 4, wherein said CCM further comprises a gas chamber containing a compressible medium.

8. An improved shock absorber comprising:
   an outer cylinder characterized by an outer cylinder cavity, a top outer cylinder end, and a bottom outer cylinder end; and
   a shock absorber cartridge disposed substantially in the outer cylinder cavity and protruding through the top outer cylinder end, said shock absorber cartridge comprising:
   a cartridge containment member (CCM) characterized by an inner CCM cavity, a CCM opening, and a CCM lip about the CCM opening; and
   an inner shock assembly disposed substantially in the inner CCM cavity and protruding through the CCM opening, said inner shock assembly comprising an inner shock cylinder characterized by an inner cylinder cavity and an outer cylinder perimeter; with a seal member which couples said CCM to said inner shock cylinder, with the CCM lip being disposed between said seal member and said inner shock cylinder, with said seal member disposed between the CCM lip and said outer cylinder, and with the CCM lip engaging the outer cylinder perimeter.

9. An improved shock absorber comprising:
   an outer cylinder characterized by an outer cylinder cavity, a top outer cylinder end, and a bottom outer cylinder end; and
   a shock absorber cartridge disposed substantially in the outer cylinder cavity and protruding through the top outer cylinder end, said shock absorber cartridge comprising:
   a cartridge containment member (CCM) characterized by an inner CCM cavity, a CCM opening, and a CCM lip about the CCM opening; and
   an inner shock assembly disposed substantially in the inner CCM cavity and protruding through the CCM opening, said inner shock assembly comprising an inner shock cylinder characterized by an inner cylinder cavity and an outer cylinder perimeter;
   said inner shock cylinder is further characterized by an upper cylinder end and a lower cylinder end, the CCM lip engages the outer cylinder perimeter of said inner shock cylinder near the upper cylinder end, and said inner shock assembly further comprises:
      a base valve assembly coupled to the lower cylinder end of said inner shock cylinder;
      an upper cylinder head coupled to the upper cylinder end of said inner shock cylinder;
      a piston disposed in the inner cylinder cavity of said inner shock cylinder; and
      a piston rod coupled to said piston extending through said upper cylinder head and through the top outer cylinder end.

10. The shock absorber of claim 9, further comprising shock fluid disposed in the CCM cavity and the inner cylinder cavity.

11. The shock absorber of claim 9, further comprising a seal member which couples said CCM to said inner shock cylinder, the CCM lip disposed between said seal member and said inner shock cylinder, and said seal member disposed between the CCM lip and said outer cylinder.

12. The shock absorber of claim 11, wherein said seal member comprises an o-ring, and said inner cylinder comprises a seal member positioning feature.

* * * * *